United States Patent [19]

Cifaldi

[11] Patent Number: 5,027,749
[45] Date of Patent: Jul. 2, 1991

[54] HIGH EFFICIENCY WATER HEATER

[75] Inventor: Rocco Cifaldi, London, Canada

[73] Assignee: Stacey Heating & Plumbing Supplies, Ltd., London, Canada

[21] Appl. No.: 598,374

[22] Filed: Oct. 16, 1990

[51] Int. Cl.[5] .............................................. F22B 5/00
[52] U.S. Cl. ...................................... 122/17; 122/14; 126/361
[58] Field of Search ...................... 122/17, 16, 18, 19, 122/14; 126/361

[56] References Cited

U.S. PATENT DOCUMENTS

| | | | |
|---|---|---|---|
| 2,003,742 | 6/1935 | Elliot | 122/17 |
| 4,438,728 | 3/1984 | Fracaro | 122/17 X |
| 4,676,199 | 6/1987 | Daugirda et al. | 122/17 |

Primary Examiner—Edward G. Favors
Attorney, Agent, or Firm—Merchant, Gould, Smith, Edell, Welter & Schmidt

[57] ABSTRACT

A multi-stage high efficiency gas fired water heater is provided which includes a lower storage tank and an upper recovery tank around a central flue. Scraping chambers are formed above and below the storage tanks for heat transfer from heated combustion gases. Secondary flues extend through the recovery tank to recover further heat from heated combustion gases. The storage tank acts as a lower volume booster tank from which water at a pre-set temperature may be drawn. Water in the recovery tank is preheated by heat transfer from the combustion gases in the scraping chambers and the central and secondary flues.

8 Claims, 1 Drawing Sheet

HIGH EFFICIENCY WATER HEATER

BACKGROUND OF THE INVENTION

In a conventional gas fired water heater, a gas burner is located beneath the lower end of the water tank in a header space. A central vertical flue is provided through the tank for discharge of the waste combustion or flue gases. Water in the tank is heated by heat from the burner in the lower header space and from the waste gases passing upwardly through the central flue.

Considerable heat losses occur during non-use or standby periods with conventional gas fired water heaters. Since all of the water in the tank is to be heated to the same pre-set temperature, large amounts of energy are expended to keep this large volume of water at this high temperature. Also, heated water rises to the top of the tank by convection causing the water to stratify and become overheated at the top of the tank. Drawing limited amounts of water from the top of the tank may result in overheated water being delivered. With a single central flue, although some increase in heating efficiency is gained by heat transfer from the flue gases, this is limited to that amount of heat which can be transferred to the water in close proximity to the central flue.

U.S. Pat. No. 4,676,199, issued June 30, 1987 to Daugirda et al. and assigned to Rheem Manufacturing Company discloses a multistage, high efficiency, gas fired water heater including a lower primary heating tank and an upper secondary heating tank. A plurality of primary flues are provided through the primary tank which are aligned with secondary flues in the secondary tank. Manifolds are situated above, below and between the tanks. One of the primary flues is constructed to operate as a condensate removal pipe for draining water from the secondary flues. This water heater design is complicated by the provision of both primary and secondary flues in both tanks. The flues must be aligned and of different diameters for proper functioning.

SUMMARY OF THE INVENTION

There is a need for a relatively simple high efficiency gas fired water heater which utilizes multiple stages to heat the water, while maintaining the simplicity of the central flue design.

In accordance with the present invention a gas fired water heater is provided which includes a lower storage tank and an upper recovery tank within an insulated housing. Cold water is provided through inlet means into the recovery tank and heated water is removed through outlet means from the storage tank. The recovery and storage tanks are interconnected to transfer heated water from the recovery tank to the storage tank. A central flue is provided through both tanks. A plurality of secondary flues are located in the upper recovery tank. Scraping chambers are formed above, below and between the tanks in communication with the central flue. With this design, heated combustion gases from the burner mounted below the storage tank heat the water in the storage and recovery tanks from both the central and secondary flues and through the scraping chambers. The lower storage tank acts as a booster, holding a volume of water at a pre-set temperature above that of the water in the recovery tank.

The lower ends of the storage and recovery tanks and the upper end of the housing are preferably convex shaped such that heated combustion gases are diverted from the central flue to the scraping chambers. Deflectors are preferably provided in the flues and the diameter of the central flue is preferably narrowed adjacent the upper end of the recovery tank to slow the passage of the heated combustion gases in the flues and to divert the gases into the scraping chambers and the secondary flues. The scraping chambers are preferably shaped such that the opening into each chamber from the central flue is larger than the opening formed by the central flue or the vent means. This preferred design causes the heated combustion gases to mushroom into the scraping chambers above and below the tanks to more completely envelope the storage recovery tanks and deflect the gases into the secondary flues and to maximize heat transfer efficiency to the water in the tanks before the gases are vented. The storage tank can be downsized from that of a single tank water heater to maximize heat efficiency at peak draw times, while minimizing heat losses during standby or low use times.

Broadly stated, the gas fired water heater of this invention comprises an insulated housing having upper and lower ends; burner means in the housing adjacent its lower end for burning gas and producing heated combustion gases; a storage tank in the housing above the burner means; a recovery tank in the housing above the storage tank; vent means at the upper end of the housing; a flue located centrally in the housing and extending from the burner means to the vent means through the storage and recovery tanks; a first scraping chamber formed adjacent the burner means in open communication with the central flue and in heat transfer relationship with the bottom of the storage tank; a second scraping chamber formed between the storage and recovery tanks in open communication with the central flue and in heat transfer relationship with the top of the storage tank and the bottom of the recovery tank; a third scraping chamber formed above the recovery tank in open communication with the central flue and in heat transfer relationship with the top of the recovery tank; a plurality of secondary flues extending through the recovery tank between the second and third scraping chambers; water inlet means for introducing cold water to the lower end of the recovery tank; water outlet means for removing heated water from the upper end of the storage tank; and water transfer means for transferring water from the upper end of the recovery tank to the lower end of the storage tank.

DESCRIPTION OF THE PREFERRED EMBODIMENT

Figure 1:
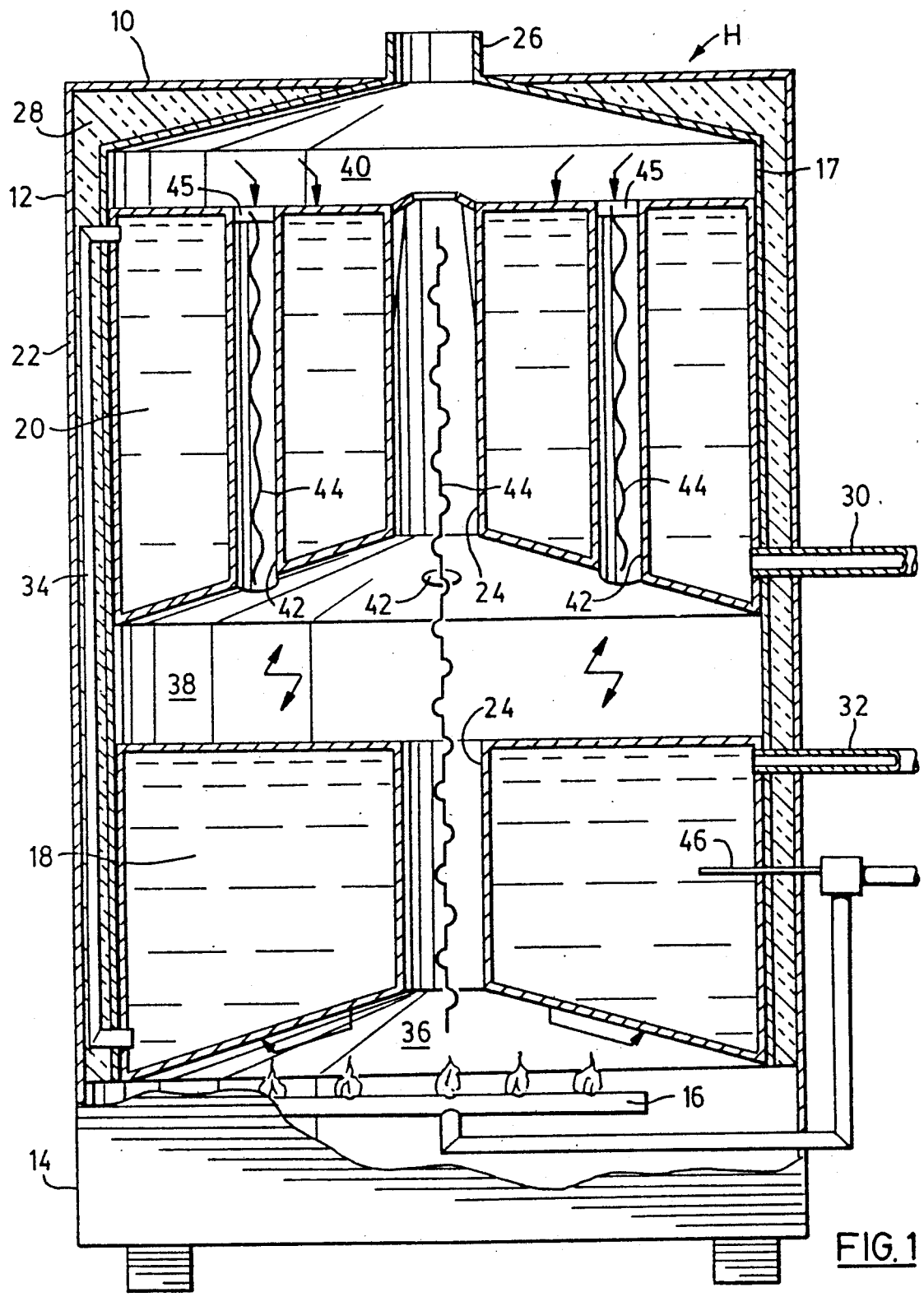
FIG. 1 is a vertical section of the water heater of the present invention.

A preferred embodiment of the water heater H present invention is shown in FIG. 1 to include a housing 10 having upper and lower ends 12, 14 respectively. A burner 16 adapted to combust gas such as natural gas or propane or some other combustible material such as oil is located at the lower end 12. While the invention is disclosed in respect of a gas-fired water heater, it is equally applicable to water heaters which burn other combustible fuels. Such water heaters are intended to fall within the scope of the claims. The housing 10 includes an inner tank 17 and an outer casing 22. A storage tank 18 is formed in the housing 10 above the burner 16. A recovery tank 20 is formed in the housing 10 above the storage tank 18. A central flue 24 extends vertically from the burner through the storage and recovery tanks 18, 20. A vent 26 is provided at the upper end 12 of the housing 10 to vent combustion gases from the water heater H. The vent 26 is preferably centrally positioned above the central flue 24, as shown in the Figure. The flow of combustion gases within the housing 10 is preferably by convection only, the vent 26 communicating with a chimney (not shown). A mechanical draft unit (not shown) may be used for forced flow should it be desirable to vent gases directly through an exterior wall of a building. The tanks 18, 20 are surrounded by insulation 28 within the housing 10 between the outer casing 22 and the inner tank 17.

A water inlet 30 leads into the lower end of the recovery tank 20 for introducing cold water thereto. The water is preferably distributed evenly through a distributing head (not shown) to prevent cold spots at the inlet which can lead to condensation from the combustion gases. The water inlet 30 and optional distributing head defines a water inlet means for introducing cold water to the lower end of the recovery tank 20.

A water outlet 32 is located at the upper end of the storage tank 18 for removing heated water therefrom. This outlet 32 defines a water outlet means for removing heated water from the upper end of the storage tank 18.

A water transfer pipe 34 extends from the upper end of the recovery tank 20 to the lower end of the storage tank 18 and defines a water transfer means for transferring heated water from the upper end of the recovery tank 20 to the lower end of the storage tank 18.

A first scraping chamber 36 is formed adjacent the burner 16 below the storage tank 18. The chamber 36 is open to the central flue 24. Heated combustion gases produced by the burner 16 impinge against the bottom of the storage tank 18 to cause heat transfer therethrough to the water in the storage tank 18. A second scraping chamber 38 is formed between the storage and recovery tanks 18, 20 in open communication with the central flue 24. Heated combustion gases rising in the central flue 24 enter the chamber 38 to cause heat transfer through the top of the storage tank 18 and the bottom of the recovery tank 20 to the water in these tanks 18, 20. A third scraping chamber 40 is formed above the top of the recovery tank 20 in open communication with the central flue 24. Heated combustion gases rising in the central flue 24 enter the chamber 40 to cause heat transfer through the top of the recovery tank 20 to the water in the recovery tank 20.

A plurality of secondary flues 42 extend through the recovery tank 20 between the second and third scraping chambers 38, 40. In the embodiment shown in the Figure, four secondary flues 42 are spaced equidistantly around the central flue 24, two being shown in the vertical cross-section, however, the number may be varied according to the size of the tank 20 and the desired heat transfer efficiency. Heated combustion gases in the second scraping chamber 38 rise through these secondary flues 42 to further heat the water in the recovery tank 20. Thus, water in the recovery tank 20 is heated by heat transfer from the heated combustion gases enveloping like tank 20 from the bottom and top of the tank 20, the central flue 24, and the secondary flues 42. Water in the storage tank 18 is heated by heat transfer from the heated combustion gases enveloping the tank 18 from the central flue 24 and from the top and bottom of the tank 18.

Deflectors or baffles 44 of conventional design such as twisted metal ribbons are located in both the central and secondary flues 24, 42 to slow down the flow of the combustion gases and improve heat transfer through the flues. The deflectors 44 are preferably hung from a T-bar 45 from the top of the flues 24, 42 such that they can be removed for cleaning as needed.

Apart from the deflectors 44, a number of additional preferred features are included to slow down the flow of the combustion gases and to cause combustion gases to mushroom into the scraping chambers 36, 38, 40 and be diverted into the secondary flues 42 in order to maximize heat transfer through these areas. Firstly, the diameter of the central flue 24 is restricted adjacent the upper end of the recovery tank 20, either by tapering as shown in FIG. 1 or by a deflector (not shown), either of which would define restricting means on the central flue to narrow the diameter of the central flue adjacent the upper end of the recovery tank 20. Secondly, the openings from the central flue through which the gases enter or mushroom into the scraping chambers 36, 38, and 40 are preferably larger than the openings formed by the central flue 24 or the vent 26. Thirdly, the bottoms of the storage tank 18 and the recovery tank 20 are preferably convex in shape, that is they are inlined downwardly from the central flue 24 to their outer perimeter. These features combine to form scraping chambers sized and shaped to divert or mushroom the heated combustion gases from the central flue 24 into the chambers and the secondary flues for maximum heat transfer.

A temperature probe 46, of conventional design is preferably located in the upper portion of the storage tank 18 to sense the pre-set temperature and control the burner 16 in response thereto. The water heater H of this invention is preferably operated at temperatures sufficiently high so as to discourage condensation of water vapour from the combustion gases. This enables the tanks 18, 20 and flues 24, 42 to be formed from standard steel or other heat conductive material. However, if greater heat removal from the combustion gases is desired, which would cause condensation in the heater, a drainage system as envisaged in U.S. Pat. No. 4,676,199 could be used to collect condensate from the second scraping chamber 38 and drain it from the heater H and stainless steel could be used as the heat conductive material for the tanks 18, 20 and the flues 24, 42.

It will be appreciated that the storage tank 18 has a booster effect on demand water. Firstly, the reduced size and the shape of the tank 18 maximize heat transfer as heated combustion gases envelope the tank 18 from the scraping chambers 36, 38 and from the central flue 24. Secondly, the reduced size of the tank 18 increases energy efficiency as a lower volume of water is held at the pre-set temperature in stand-by periods.

The present invention has been disclosed with reference to a single storage tank 18 and a single recovery tank 20, however, it is within the skill of one in this art to construct a water heater with a plurality of either or both of these tanks. Such variation is included within the scope of the present claims.

It is also possible that the storage and recovery tanks 18, 20 could be spaced from the walls of the housing 10 to allow for more complete envelopment by the flow of the combustion gases around the entire surface of the tanks 18, 20.

While the present invention has been shown and described with reference to its preferred embodiment, the invention is to be limited only by the following claims and their equivalents.

I claims:

1. A gas fired water heater comprising:
   an insulated housing having upper and lower ends;
   burner means in the housing adjacent its lower end for burning gas and producing heated combustion gases;
   a storage tank in the housing above the burner means;
   a recovery tank in the housing above the storage tank;
   vent means at the upper end of the housing;
   a flue located centrally in the housing and extending from the burner means to the vent means through the storage and recovery tanks;
   a first scraping chamber formed adjacent the burner means in open communication with the central flue in heat transfer relationship with the bottom of the storage tank;
   a second scraping chamber formed between the storage and recovery tanks in open communication with the central flue and in heat transfer relationship with the top of the storage tank and the bottom of the recovery tank;
   a third scraping chamber formed above the recovery tank in open communication with the central flue and in heat transfer relationship with the top of the recovery tank;
   a plurality of secondary flues extending through the recovery tank between the second and third scraping chambers;
   water inlet means for introducing cold water to the lower end of the recovery tank;
   water outlet means for removing heated water from the upper end of the storage tank; and
   water transfer means for transferring water from the upper end of the recovery tank to the lower end of the storage tank.

2. The water heater of claim 1, wherein the openings from the central flue to each of the scraping chambers are larger than the openings formed by the central flue or the vent means to cause the flow of the combustion gases to mushroom into the scraping chambers and to be diverted into the secondary flues.

3. The water heater of claim 2, wherein the lower ends of the storage and recovery tanks and the upper end of the housing are generally convex shaped such that the scraping chambers are larger adjacent the central flue than at their outer perimeters.

4. The water heater of claim 2, which further comprises:
   deflectors extending through the central and secondary flues to slow the passage of combustion gases therethrough; and
   restricting means on the central flue adjacent the upper end of the recovery tank to narrow the diameter of the central flue, the deflectors and the restricting means cooperating to slow the passage of combustion gases in the flues and to increase the diversion of the combustion gases through the scraping chambers and the secondary flues.

5. The water heater of claim 3, which further comprises:
   deflectors extending through the central and secondary flues to slow the passage of combustion gases therethrough; and
   restricting means on the central flue adjacent the upper end of the recovery tank to narrow the diameter of the central flue, the deflectors and the restricting means cooperating to slow the passage of combustion gases in the flues and to increase the diversion of the combustion gases through the scraping chambers and the secondary flues.

6. The water heater of claim 2, wherein the secondary flues are of smaller diameter than the central flue.

7. The water heater of claim 3, wherein the secondary flues are of smaller diameter than the central flue.

8. The water heater of claim 4, wherein the secondary flues are of smaller diameter than the central flue.

* * * * *